(12) United States Patent
Valys et al.

(10) Patent No.: US 6,535,915 B1
(45) Date of Patent: Mar. 18, 2003

(54) AUTOMATIC REDUCTION OF DATA NOISE IN INSTALLATION PACKAGES FOR A COMPUTER SYSTEM

(75) Inventors: David T. Valys, Austin, TX (US); James P. McGlothlin, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/405,862

(22) Filed: Sep. 24, 1999

(51) Int. Cl.[7] .................. G06F 15/177; G06F 9/445
(52) U.S. Cl. .................. 709/222; 709/221; 717/178
(58) Field of Search ................ 709/220–222; 717/168–178; 713/1, 100

(56) References Cited

U.S. PATENT DOCUMENTS

| | | |
|---|---|---|
| 5,247,683 A | 9/1993 | Holmes et al. |
| 5,291,585 A | 3/1994 | Sato et al. |
| 5,421,009 A | 5/1995 | Platt |
| 5,748,575 A | 5/1998 | Lee |
| 5,794,052 A | 8/1998 | Harding |
| 5,802,297 A | 9/1998 | Engquist |
| 5,805,897 A | 9/1998 | Glowny |
| 5,835,777 A | 11/1998 | Staelin |
| 5,842,024 A | 11/1998 | Choye et al. |
| 5,860,012 A * | 1/1999 | Luu .................. 709/220 |
| 5,930,513 A * | 7/1999 | Taylor .................. 707/1 |
| 5,963,743 A * | 10/1999 | Amberg et al. .......... 707/104.1 |
| 5,991,543 A * | 11/1999 | Amberg et al. .......... 713/1 |
| 5,995,757 A * | 11/1999 | Amberg et al. .......... 717/175 |
| 6,026,438 A * | 2/2000 | Piazza et al. .......... 709/220 |
| 6,080,207 A * | 6/2000 | Kroening et al. ......... 717/172 |
| 6,192,518 B1 * | 2/2001 | Neal .................. 709/221 |
| 6,262,726 B1 * | 7/2001 | Stedman et al. .......... 345/745 |
| 6,279,155 B1 * | 8/2001 | Amberg et al. .......... 710/104 |
| 6,279,156 B1 * | 8/2001 | Amberg et al. .......... 717/124 |
| 6,282,711 B1 * | 8/2001 | Halpern et al. .......... 709/203 |
| 6,327,706 B1 * | 12/2001 | Amberg et al. .......... 702/123 |
| 6,367,075 B1 * | 4/2002 | Kruger et al. .......... 717/169 |

FOREIGN PATENT DOCUMENTS

GB 2344440 A * 6/2000 ......... G06F/09/445

* cited by examiner

*Primary Examiner*—Andrew Caldwell
(74) *Attorney, Agent, or Firm*—Michael J. Balconi-Lamica; Haynes and Boone, LLP

(57) ABSTRACT

In a method for reduction of data noise in installation packages for a computer system, a first change list is established based upon a set of differences resulting from installation of a configuration change or a vendor product on a first computer system. A second change list is established based upon a set of differences resulting from installation of the configuration change or the vendor product on a second computer system. The first change list is compared with the second change list to produce a resultant change list including an intersecting set of changes. The intersecting set includes common changes between installations on the first computer system and the second computer system, accordingly filtering out of randomly generated installation noise. A re-engineered installation package is created using the intersecting set of changes. The re-engineered installation package is suitable for downloading of a re-engineered installation of the configuration change or the vendor product onto at least one target computer system in a build-to-order manufacturing process.

53 Claims, 4 Drawing Sheets

AUTOMATIC REDUCTION OF DATA NOISE IN INSTALLATION PACKAGES FOR A COMPUTER SYSTEM

This application relates to U.S. patent application Ser. No. 08/919,959, filed on Aug. 29, 1997, now U.S. Pat. No 5,995,757, entitled "Software Installation and Testing for a Build-to-order Computer System", naming Richard D. Amberg, Roger W. Wong and Michael A. Brundridge as inventors.

This application relates to U.S. patent application Ser. No. 08/984,357, filed on Dec. 3, 1997, now abandoned, entitled "Technique for Performing Factory Installation of Software", naming John A. Odendahl as inventor.

This application relates to U.S. patent application Ser. No. 08/921,438, filed on Aug. 29, 1997, now U.S. Pat. No. 5,963,743, entitled "Database for Facilitating Software Installation and Testing for a Build-to-suit Computer System", naming Richard D. Amberg, Roger W. Wong and Michael A. Brundridge as inventors.

This application relates to U.S. patent application Ser. No. 09/236,862, filed on Jan. 25, 1999, now U.S. Pat. No. 6,247,126, entitled "Recoverable Software Installation Process and Apparatus for a Computer System" naming Alan E. Beelitz and Richard D. Amberg as inventors.

This application relates to U.S. patent application Ser. No. 09/237,760, filed on Jan. 26, 1999, now U.S. Pat. No. 6,279,176, entitled "A Method of Installing Software on and/or Testing a Computer System", naming Richard D. Amberg, Roger W. Wong and Michael Lynch as inventors.

This application relates to U.S. patent application Ser. No. 08/514,649, filed on Aug. 14, 1995, now U.S. Pat. No. 5,894,571, entitled "A Process for Configuring Software in a Build-To-Order Computer System", naming Clint H. O'Connor as inventor.

This application relates to U.S. patent application Ser. No. 09/012,962, filed on Jan. 26, 1998, now U.S. Pat. No. 6,182,275, entitled "Generation of a Compatible Order for a Computer System", naming Alan E. Beelitz and Paul J. Maia as inventors.

This application relates to U.S. patent application Ser. No. 09/060,123, filed on Apr. 14, 1998, entitled "Late Binding Dynamic Software Configuration Information", naming Vamsi Ayyagari as inventor.

This application relates to U.S. patent application Ser. No. 09/066,128, filed on Apr. 24, 1998, now U.S. Pat. No. 6,298,443, entitled "Method and System for Supplying a Custom Software Image to a Computer System", naming Tom Colligan, Jonathan Ellis and Hunter Robertson as inventors.

This application relates to U.S. patent application Ser. No. 09/237,758, filed on Jan. 26, 1999, now U.S. Pat. No. 6,279,155, entitled "A Method of Installing Software on and/or Testing a Computer System", naming Richard D. Amberg, Roger Wong and Michael Lynch as inventors.

These co-pending applications are is incorporated herein by reference in their entirety, and are assigned to the assignee of the present invention.

BACKGROUND

The disclosures herein relate generally to computer systems, and more particularly, to a method and apparatus for automatic reduction of data noise in re-engineered software installation packages used in the manufacture of build-to-order computer systems.

Software re-engineering of third party software package installations support a build-to-order computer manufacturing process. Generally, a vendor (i.e., third party) software package, a customer's custom installation, or some other configuration change is designated for installation in the computer build-to-order manufacturing process. A configuration change includes a more general form of change, whereas, a software product install is more specific. Such a vendor software package, customer's custom installation, or other configuration change comprise an "As Delivered Package." The As Delivered Package is processed and prepared via software re-engineering for uploading onto a manufacturing server. Once on the manufacturing server, the re-engineered installation is available for downloading onto target computer systems being manufactured.

Re-engineering of software installations to be installed on computer systems in a build-to-order manufacturing environment can be accomplished via state change comparison. State change comparison is a technique that includes several steps. First, query the state of each relevant configuration entity in a given computer system environment prior to making a prescribed configuration change. Such an entity may include a registry, files, INIs, services, etc. Next, the configuration change is installed on the given computer system being manufactured. Query the state of each configuration entity in the given computer system environment a second time. Compare the results of the first and second queries and determine what changes, if any, to the computer system were caused by the configuration change. Lastly, use the change information to be able to reproduce the installation on computer systems in the build-to-order computer system manufacturing process.

The change information obtained using the method described above includes a first category of changes in the computer system that should not be performed in reproducing the installation with respect to another computer system being manufactured. Accordingly, the first category of changes are changes which the configuration change or product's installation did not explicitly cause. For instance, such changes in the first category include changes caused by a rebooting of the computer system being manufactured. Other changes may include changes occurring due to various adapters initializing, providing performance data, rerouting, etc. Still further, such changes may occur in response to installation information set up by a third party vendor install program for connecting to a particular hardware device or component. The particular hardware device or component may not exist on a computer system being manufactured for which the installation is downloaded.

Accordingly, a problem occurs when the changes, such as those of the first category, are applied to another computer system being manufactured which is different from the computer system used in establishing the change information. The subsequently manufactured computer system may or may not include the same components (i.e., hardware or software) as a previously manufactured computer system. Applying the changes may undesirably corrupt a subsequently manufactured computer system. Changes may also refer to hardware, software, or dynamic data (e.g., a time stamp) changes that are not the same on the subsequently manufactured computer system. Such undesired changes are referred to herein as noise. Noise can occur anywhere in the build-to-order manufacturing environment. There are no set locations for such an occurrence of noise.

Prior methods for addressing the above problem of data noise in installation packages have included automatically processing a list of entities which are normally considered noise. Each item of noise in the list is erased from an installation package prior to its installation on the target system. However, this causes an additional problem, in that, sometimes the information which gets erased may actually be needed for a given computer system. Manufacturing engineers are then required to individually identify and erase any noise entities not in the automatically processed list or to replace any incorrect erasures.

An improved method and apparatus for handling noise generated as a result of a re-engineered installation of software products in the manufacturing of build-to-order computer systems is thus needed.

SUMMARY

According to the embodiments disclosed herein, in a method for reduction of data noise in installation packages for a computer system, a first change list is established based upon a set of differences resulting from installation of a configuration change or a vendor product on a first computer system. A second change list is established based upon a set of differences resulting from installation of the configuration change or vendor product on a second computer system. The first change list is compared with the second change list to produce a resultant change list including an intersecting set of changes. The intersecting set includes common changes between installations on the first computer system and the second computer system, accordingly filtering out of randomly generated installation noise.

A principal advantage of this embodiment is that random noise is significantly reduced in a re-engineered installation of software products in the manufacturing of build-to-order computer systems. An improved method and apparatus for handling noise generated as a result of installation of vendor products in the manufacturing of build-to-order computer systems is provided.

DETAILED DESCRIPTION

Figure 1:
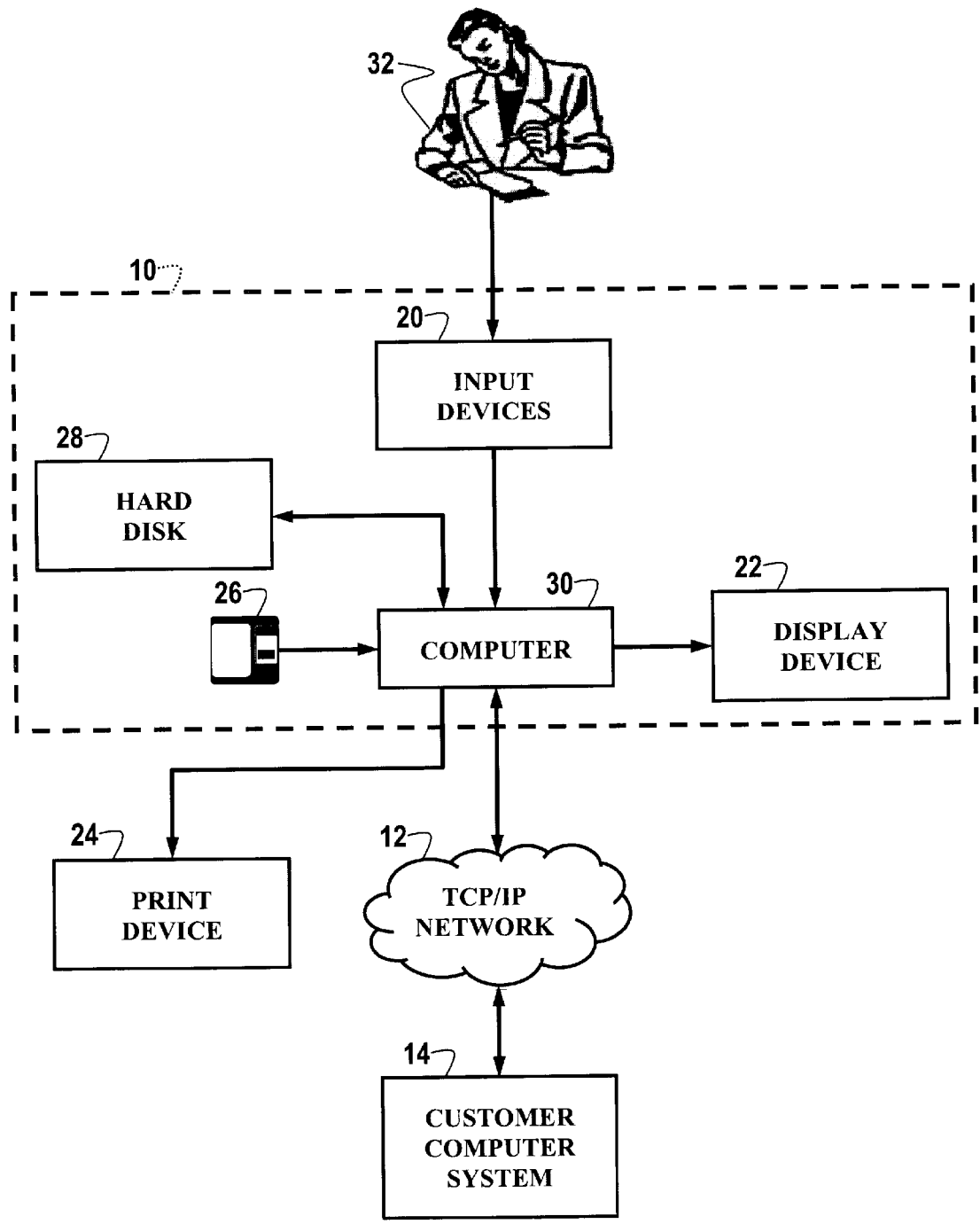
FIG. 1 is a block diagram view of an exemplary build-to-order manufacturing computer system according to an illustrative embodiment of the present disclosure.

FIG. 1 is a block diagram view of a build-to-order (BTO) computer manufacturer computer system according to an illustrative embodiment of the present disclosure. The BTO computer manufacturer computer system is generally indicated at 10 and includes various components. Computer system 10 is disposed for being coupled through a global network 12 to at least one customer computer system 14.

The BTO computer manufacturer computer system 10 includes input devices 20, a display device 22, a print device 24, and a computer 30 for executing processes and performing operations (e.g. communicating information) in response thereto as discussed further herein below. In the illustrative embodiment, computer 30 is an IBM compatible personal computer ("PC") that executes Microsoft Windows 95, 98, NT, or other suitable operating system software. All Microsoft products identified herein are available from Microsoft Corporation, One Microsoft Way, Redmond, Wash. 98052-6399. In another illustrative embodiment, computer 30 is a network server having a suitable operating system.

Computer 30 is connected to input devices 20, display device 22 and print device 24. Display device 22 is, for example, a conventional electronic cathode ray tube. Print device 24 is, for example, a conventional electronic printer or plotter. Also, computer 30 includes internal speakers for outputting audio signals. In an alternative embodiment, the speakers are external to computer 30. Moreover, system 10 includes (a) a first computer-readable medium (or apparatus) 26 such as a floppy diskette and (b) a second computer-readable medium (or apparatus) 28 such as a computer hard disk. Computer-readable media (or apparatus) can also include a CD-ROM or other similar media.

A human user 32 and computer 30 operate in association with one another. For example, in response to signals from computer 30, display device 22 displays visual images, and user 32 views such visual images. Also, in response to signals from computer 30, print device 24 prints visual images on paper, and user 32 views such visual images. Further, user 32 operates input devices 20 in order to output information to computer 30, and computer 30 receives such information from input devices 20.

Input devices 20 include, for example, a conventional electronic keyboard and a pointing device such as a conventional electronic "mouse", roller ball, touch pad, light pen, or other similar device. User 32 operates the keyboard to output alphanumeric text information to computer 30, and computer 30 receives such alphanumeric text information from the keyboard. User 32 operates the pointing device to output cursor-control information to computer 30, and computer 30 receives such cursor-control information from the pointing device.

Computer 30 is structurally and functionally interrelated with each of its connected computer-readable media (e.g., computer-readable media 26 and 28), as described further herein below. For example, floppy diskette 26 stores (e.g. encodes, records, or embodies) functional descriptive material (e.g. including but not limited to computer programs (also referred to as software or applications) and information structures). Such functional descriptive material imparts functionality when encoded on floppy diskette 26. Also, such functional descriptive material is structurally and functionally interrelated to floppy diskette 26.

Within such functional descriptive material, information structures define structural and functional interrelationships between such information structures and floppy diskette 26 (and other aspects of system 10). Such interrelationships permit the information structures' functionality to be realized. Also, within such functional descriptive material, computer programs define structural and functional interrelationships between such computer programs and floppy diskette 26 (and other aspects of system 10). Such interrelationships permit the computer programs' functionality to be realized.

For example, computer 30 reads (e.g. loads, accesses, or copies) such functional descriptive material into a computer memory device (e.g. random access memory device ("RAM")) of computer 30, and computer 30 performs its operations (as described elsewhere herein) in response to such material which is stored in such memory device. More particularly, computer 30 performs the operation of processing (e.g. executing) a computer application (that is stored, encoded, recorded or embodied on a computer-readable medium) for causing computer 30 to perform additional operations (as described elsewhere herein). Accordingly, such functional descriptive material exhibits a functional interrelationship with the way in which computer 30 executes its processes and performs its operations.

Further, floppy diskette 26 is an apparatus from which the computer application is accessible by computer 30, and the computer application is processable by computer 30 for causing computer 30 to perform such additional operations. In addition to reading such functional descriptive material from floppy diskette 26, computer 30 is capable of reading such functional descriptive material from (or through) a computer network 12 which is another type of computer-readable medium (or apparatus) connected to computer 30. Also, the memory devices (of computer 30) are themselves computer-readable media (or apparatus). Computer system 10 further includes a database which may be maintained, for example, on hard disk 28 or other suitable digital storage.

Network 12 is a transport control protocol/Internet protocol ("TCP/IP") global computer network such as the Internet or other similar network. For communicating with (i.e. outputting information to, and receiving information from) network 12, computer 30 includes a network interface card ("NIC"), modem, or other suitable connection, which is yet another type of computer-readable medium (or apparatus) connected to computer 30. A customer computer system 14 is illustratively shown as being coupled for communicating with system 10 through the global network 12.

Figure 2:
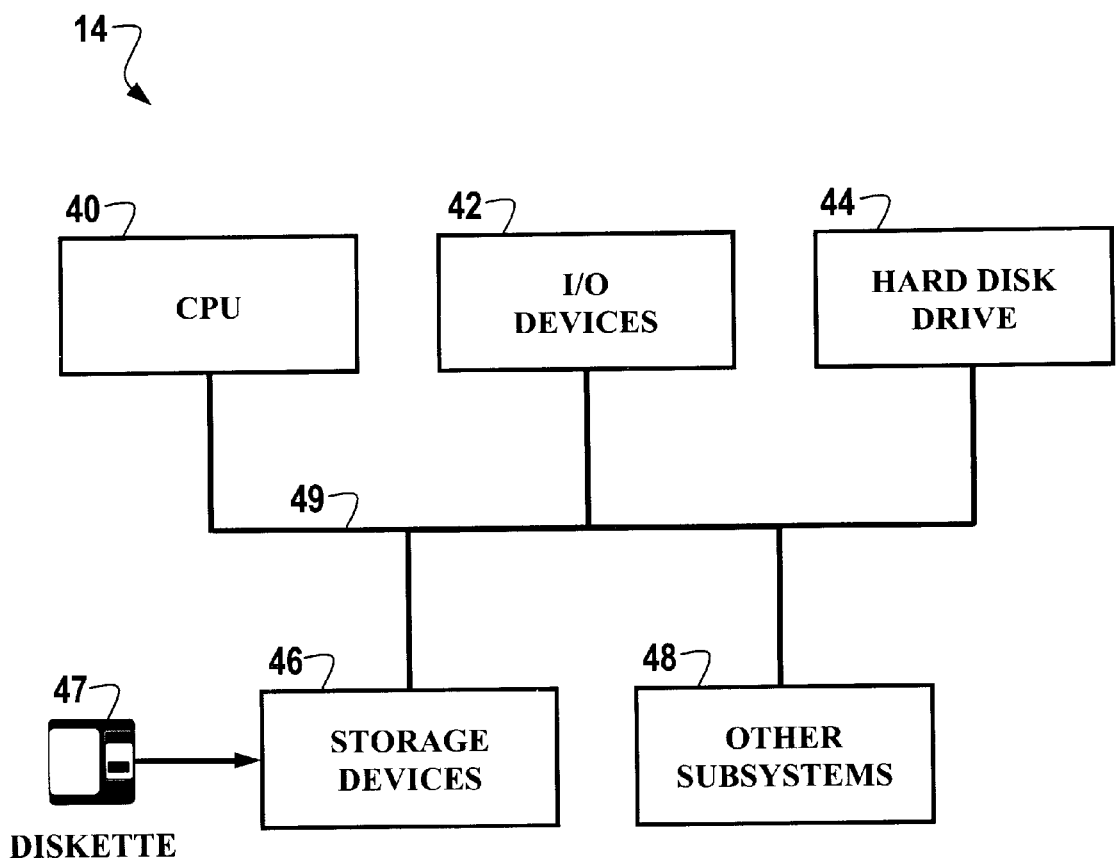
FIG. 2 is a block diagram view of an exemplary personal computer system.

Referring briefly to FIG. 2, a system block diagram of a customer computer system 14 is shown having features, for example, configured in accordance with a customer configured computer system order or plan. The computer system 14 includes a central processing unit (CPU) 40, input/output (I/O) devices, such as a display, a keyboard, a mouse, and associated controllers, collectively designated by a reference numeral 42, a hard disk drive 44, and other storage devices, such as a may include a floppy disk drive, CD-rom drive, and the like, collectively designated by a reference numeral 46, and various other subsystems, such as a memory subsystem, network interface card (or NIC), or other subsystem, collectively designated by a reference numeral 48, all interconnected via one or more buses, shown collectively as a bus 49. A computer readable media (or apparatus) 47 is illustrated also. Computer readable media 47 may include a floppy disk, diskette, CD-ROM, or other media containing instructions which are processable by computer system 14 for carrying out a desired function as discussed herein.

Figure 3:
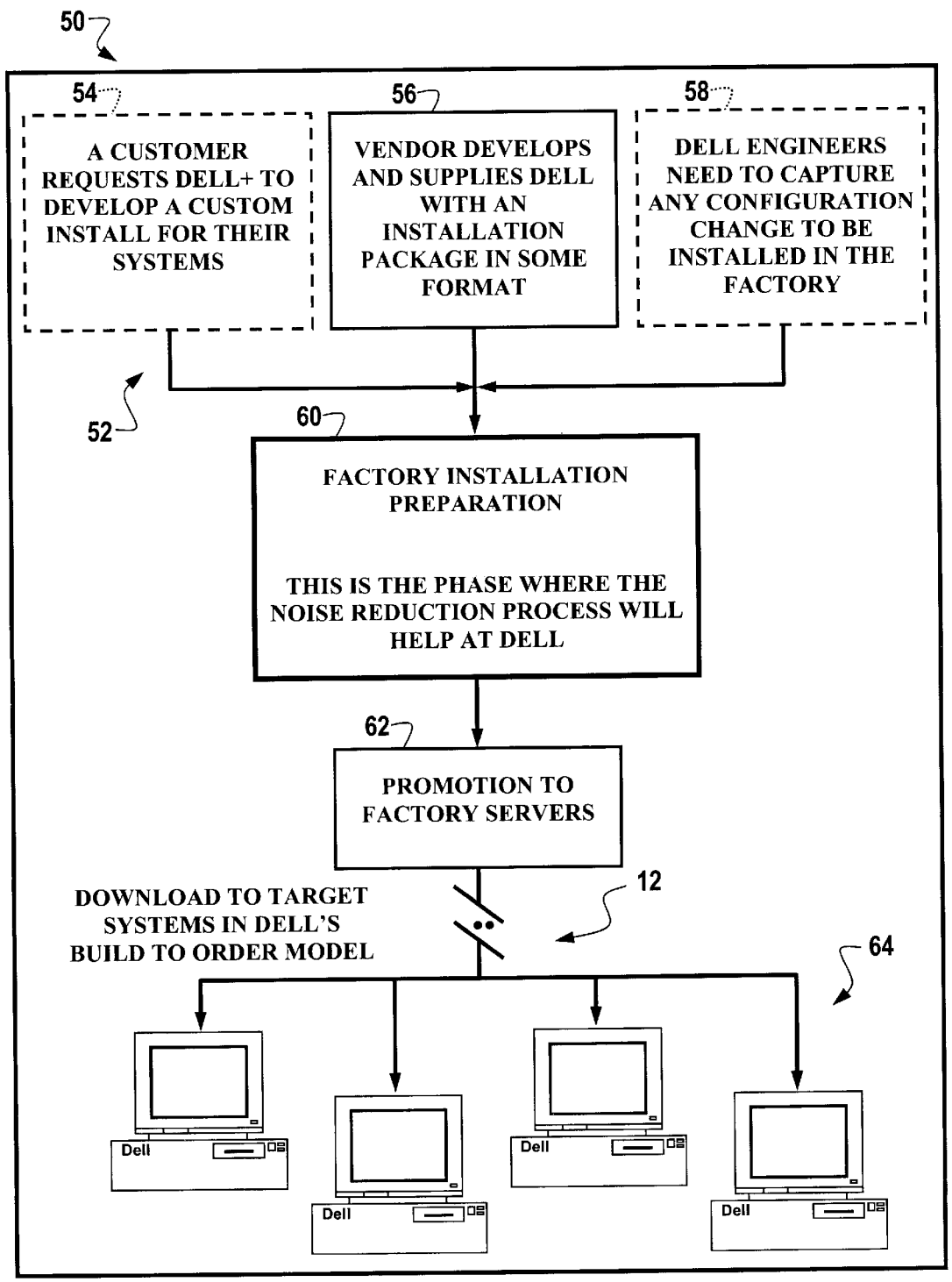
FIG. 3 is a block diagram view of a build-to-order development and manufacturing process utilizing an engineering tool according to an illustrative embodiment of the present disclosure.

Turning now to FIG. 3, in a build-to-order manufacturing process generally indicated at 50, one illustrative embodiment of an installation preparation and usage according to the present disclosures in the manufacture of computer systems shall be discussed. The installation preparation begins with one or more starting points or scenarios, generally indicated at 52. The starting points may include a customer request 54, an independent software vendor installation package 56, a prescribed configuration change 58, or other similar customer or user request requiring that a prescribed configuration change be made.

The customer request 54 can include, for example, a request of the computer manufacturer to develop a custom installation for a given customer order or plan. In the later instance, the customer order or plan can apply to more than one computer system. The independent software vendor installation package 56 can include any available installation package for a given software product, such as Microsoft Office™, Norton Anti-Virus™, Intuit Quicken™, etc. The prescribed configuration change 58 may include any change to a computer system configuration desired by a customer, system administrator, or user, to be uniformly applied to a plurality of computer systems.

A factory installation preparation process phase or module 60 generates an executable (re-engineered) installation program for use in installing a desired customer request installation 54, independent software vendor installation package 56, or other customer request 58. Creation of the executable re-engineered installation program includes reducing undesired noise in the executable installation program, as further described herein.

Upon acceptance of testing the installation program (i.e., that the installation program achieved a desired minimum level of success), the installation program is promoted to one or more factory servers 62 as may be necessary (only one shown for brevity). The factory servers 62 use the installation programs in the computer system manufacturing process. In this illustration, during the manufacturing process, the re-engineered installation programs are executed by factory servers 62 for downloading a corresponding installation onto respective target computer systems 64 according to a respective customer order or plan. Factory servers 62 are coupled to the target computer systems via a network connection 12, or other suitable connection.

If the noise in question was always the same on each computer system or workstation being manufactured, then it follows that the noise would be benign. In other words, it would not be harmful to make a change to the workstation that would occur as a side effect during the installation anyway. However, noise needing to be concerned about includes that noise which would not occur on other computer systems or workstations being manufactured, the other computer systems or workstations having different hardware and/or software configurations. Such noise includes random changes which differ between installations on more than one target system or installations on a same target system a number of times. The illustrative embodiments of the present disclosure provide a solution to the problem of random noise, further as discussed below.

As mentioned, with build-to-order manufacturing of custom configured computer systems, the computer manufacturing process includes not only hardware, but also software. This capability of build-to-order for computer systems enables customers to order virtually any combination of software application packages that can be downloaded and/or installed at the factory onto a custom configured computer system before the computer system is shipped.

As presently available software packages are exponentially larger and more complex than software packages of the past, the task of installing various combinations of the same in the build-to-order manufacturing of custom configured computer systems is an equally complex process. In the software installation process of build-to-order computer manufacturing, independent software vendor (ISV) and independent hardware vendor (IHV) software are first reverse engineered, for example, using internally developed tools as discussed, in order to create automated packages for use in the factory installation of the same on a custom configured computer system.

A reverse engineered installation of a third party software install routine is carried out in order to incorporate an automatic installation of that third party software in the manufacturing process. To do so, a desired third party software package is manually installed on a test computer system or workstation, an investigation carried out to see what the install does, and then code is written to replicate that install for custom configured computer systems to be built in the build-to-order manufacturing process.

During reverse engineering, the content of an installation of the third party software installed on a given operating system platform of the test computer system is captured (i.e., recorded). The content may include added files and/or modifications to existing files having occurred as a result of the installation. By reverse engineering a method of installing third party software (i.e., without using the third party's install software, except it's use during the reverse engineering phase), the custom configured computer system manufacturer can create unique install routines or software for automatically installing the various third party software packages onto custom configured computer systems being manufactured.

In the manufacturing process, suitable instructions are placed in an operating system (OS) setup, e.g., to hook into the OS setup, for installing desired third party software packages using the re-engineered installer software. The installer software, generated from the reverse engineering effort, is specifically created for each respective third party software package for that purpose. Whenever OS setup calls the installer for a given third party software package, the installer makes changes to the target computer system as captured during the reverse engineering of the respective third party software package install. A separate work effort is generally needed for creating a reverse engineered installer program for each third party software package and operating system platform combination.

Downloading of a given third party software package includes placing the software code on a partitioned hard disk drive of a target computer system. Installing the third party software package on the target system includes integrating the third party software package with the operating system of the target system.

Figure 4:
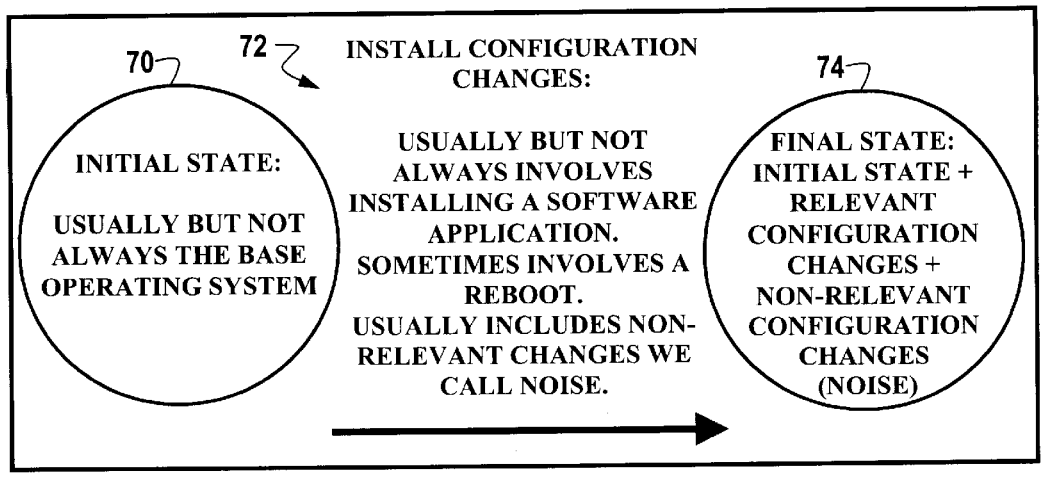
FIG. 4 is a Venn diagram view illustrating a portion of the method according to an illustrative embodiment of the present disclosure.
Figure 5:
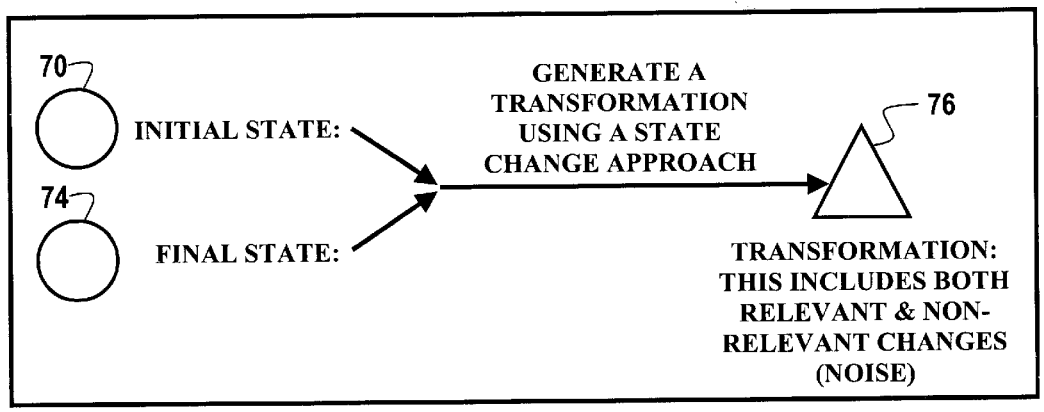
FIG. 5 is a Venn diagram view illustrating another portion of the method according to an illustrative embodiment of the present disclosure.

Referring now to FIGS. 4 and 5, in a first step, the changes created by an original installation on two test computer systems or workstations (i.e., at least two different workstations, not shown for brevity) are determined. Each workstation begins in an initial state which usually, but not always, includes a base operating system, as indicated generally at 70. For the workstations, hardware that is not required for the particular software program being installed is preferably varied on each.

The configuration changes are then installed on each workstation, generally indicated at 72. Installing the configuration changes usually, but not always, involves installing a software application. Installing the configuration changes may sometimes involve a reboot of the workstation. Such installations include non-relevant changes, which are referred to herein as noise. Subsequent to the installations, each workstation will have a final state, generally indicated at 74. The final state of a respective workstation includes a respective initial state, relevant configuration changes, and non-relevant configuration changes (i.e., noise).

For each of the two workstations and in a similar manner, a re-engineered software installation package (or listing) is created using known techniques. For example, with reference to FIG. 5, the re-engineered software installation package or listing for each workstation includes a corresponding set of data changes or transformation 76. In one embodiment, the transformation 76 is generated using a state change approach, obtaining a difference between the initial state 70 and the final state 74 of a respective workstation. The transformation 76 includes an identification of both relevant and non-relevant changes (noise).

Accordingly, for each of the at least two workstations, an initial state and a final state are determined. A respective initial state includes, for example, the base operating system. A respective final state includes a state which occurs as a result of configuration changes installed on a respective one of the at least two workstations. Preliminary transformations for the at least two workstations are generated using a state change approach.

Figure 6:
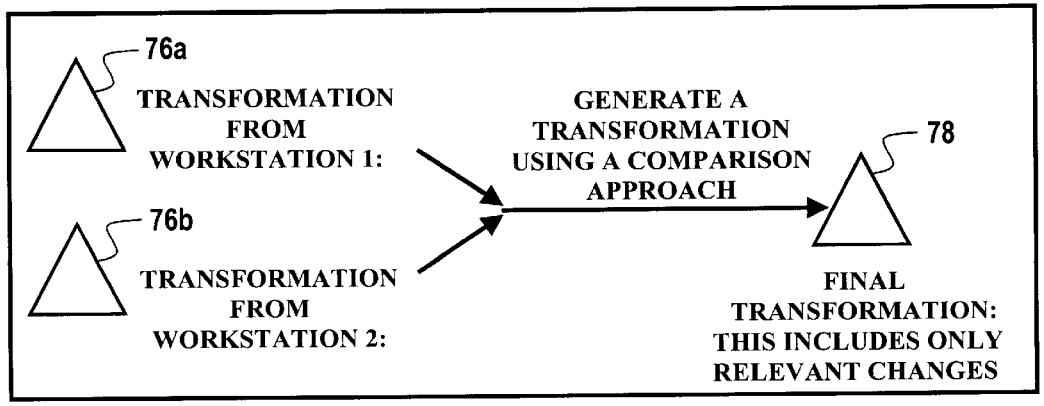
FIG. 6 is a Venn diagram view illustrating yet another portion of the method according to an illustrative embodiment of the present disclosure.

Referring now to FIG. 6, in a next step, given at least two (2) sets of data changes or transformations 76a and 76b caused by executing the same original installation program on the at least two (2) different workstations, respectively, the set of data changes is then narrowed to the intersection of the at least two sets. The intersection of the at least two sets shall hereinafter be referred to as the intersecting set or final transformation 78. In one embodiment, the final transformation 78 is generated using a comparison approach. The final transformation 78 includes only relevant changes, wherein non-relevant changes are effectively filtered out.

Accordingly, the method further includes generating a final transformation for at least two workstations using a comparison approach. The preliminary transformation of a first workstation is compared with the preliminary transformation of a second workstation to generate an intersecting set or final transformation.

In a further step, the first and second steps above are again performed for multiple different workstations until no new noise is found. That is, in another illustrative embodiment, the method includes repeating the above until the intersection of two (2) sets is identical to the original two (2) sets or the same as a previous workstation pair or workstation pairs final transformation. In another step, the set of data changes not found in the intersecting set is removed from the re-engineered software installation package. As a result, the final transformation will include only relevant changes.

The process of generating a final transformation from multiple preliminary transformations may be repeated for any number of workstation pairs, for instance, until no new noise is uncovered or the noise is the same for a previous workstation pair. The set of data changes not contained in the final transformation, that is, not found in the intersection of the preliminary transformations, is then removed from a corresponding re-engineered software installation package.

Still further, the method is not limited to pairs of workstations, but rather, various combinations of numbers of workstations may be used for obtaining a final transformation. For example, a first set S1 may intersect a second set S2 and produce intersecting set S3. Set S3 may intersect a new set S4 to produce intersecting set S5, and so on. The more workstations which get compared statistically provides a higher likelihood that the final transformation will have been trimmed of all noise.

Computer systems are information handling systems which can be designed to give independent computing power to one user or a plurality of users. Computer systems may be found in many forms, for example, mainframes, minicomputers, workstations, servers, personal computers, notebooks, notepads, and embedded systems. A typical computer system includes at least one processing unit, associated memory and a number of input/output (I/O) devices. A computer system processes information according to a program and produces resultant output information via the I/O devices. A program is a list of internally stored instructions such as a particular application program and/or an operating system. The programs that control the operation of a computer system are commonly referred to as software applications or simply software. Such software must be installed in memory of a computer system or systems in order to subsequently direct the operation of the computer system or systems.

Software pre-installation packages include condensed information for a software application install. Generic pre-installation packages are used in a factory environment to create any number of copies of a given software application or applications on the various computer systems produced. Typically, such pre-installation packages provide static or uniform copies of the software to the various computer systems produced.

Pre-installation package is software which is developed in a lab using a lab server. Pre-installation package includes various software applications and configuration information that is generic to many target computer systems. For example, a configuration file of pre-installation package includes registry information that differentiates a pure computer system (a computer system with an operating system only) from that of an installed computer system (a computer system with an operating system and various application software). Because pre-installation package includes information generic to multiple target computer systems, pre-installation package is a static pre-installation package.

The pre-installation package is developed in the lab and stored in a database on the lab server. The pre-installation package is loaded from the lab server to a factory server. At the factory server, dynamic information for carrying out late binding can be added as appropriate with the use of a suitable script file. The dynamic information is generated from an order placed by a customer for a target computer system.

Development of the pre-installation package is accomplished using a development operation. For each of at least two different workstations or target computer systems, the following is performed. During a pure capture operation, a snap shot of a pure test computer system with only an operating system is taken to generate pure configuration information. After pure capture operation and during create configuration operation, the pure configuration information obtained from the snap shot of pure capture operation is stored in a configuration file, for example, on the test computer system. After the create configuration operation and during the install application operation, an application is installed on the test computer system. After the install application operation and during the install capture operation, a snap shot of the test computer system with the operating system and installed application is taken to generate install configuration information. After the install capture operation and during the update configuration operation, the difference between the install configuration information and the pure configuration information is stored in the configuration file. After the update configuration operation and during the store operation, a pre-installation package including the configuration file is stored on the lab server. A final transformation can then be obtained as discussed above.

The present embodiments include a product used in the factory download process. That is, in the build-to-order (BTO) manufacturing process, software from many different vendors may be downloaded onto customer configured computer systems. Accordingly, different tools (i.e., re-engineered installations including final transformations as discussed above) are needed to install the respective software in the BTO manufacturing process. In the BTO factory, the installers to be used for software installations on target computer systems must all look the same and hook into the BTO factory process. For instance, the installers should require no user interaction.

According to the present embodiments, re-engineering of an original vendor software installation program involves capturing the totality of prescribed changes that the original vendor software installation program's install produces while providing a reduction in non-relevant changes (noise). The original vendor software install is reproduced as a series of state changes that result in a subsequent manufactured target computer system changing from an uninstalled state to an installed state. Accordingly, a re-engineered installation package provides for installation of the given vendor software package on a target BTO computer system.

The present illustrative embodiments further provide a tool for creation of a re-engineered installation package for use in the BTO manufacturing process. In creating the re-engineered installation package, the steps discussed with respect to FIGS. 4–6 are carried out. An executable program can be created, making use of the final transformation of identified differences, for installing the prescribed software package on a target system in the BTO factory. Each software product uses a unique installation program (i.e., the re-engineered installation program) for the software product to be installed on a target system in the BTO manufacturing process.

In the re-engineered installation program creation, a suitable discovery process is used for finding out which files or state changes have been made by the install of a software package using the original vendor software installation program. For instance, in creating a re-engineered installation program for MS Office, the following steps are carried out using at least two test computer systems or workstations having different starting configurations (which may include various combinations of hardware and/or software). Files can be examined by first taking a snap shot of the operating system (OS). The OS may include a Windows NT directory listing of system files contained therein. The snap shot records a first list of all the files with some sort of signature so that each file can be exactly determined. In a second step, the vendor product MS Office is loaded onto the target system. New files are installed, including, MS Office files, dynamic link library (DLL) files, etc., into the system folder with Windows NT. A second snap shot is taken which captures a second list of all the files with some sort of signature for each. Comparing the two lists, all of the things that have been added as a result of the install may be determined. Accordingly, state changes made by the vendor software installation program are captured. The final state is equal to the initial state plus a number of state changes, layered one after another. Changes are rebundled in a manner so that no matter which vendor provided the product, the re-engineered install looks the same to the BTO factory.

A discovery tool captures the differences in files and registries both before a vendor product install and after a vendor product install. The differences or changes may include additions as well as deletions.

With the BTO manufacturing process, re-engineered installation programs are created for the individual vendor software applications which are available for ordering with a customer configured computer system. When a customer places an order for a computer system including prescribed software application packages, the various applications are downloaded in layers, one on top of the other, onto the storage medium (e.g., the hard disk) of the target customer configured computer system. With regard to layering of the downloaded applications, each application should be independent of the others. There may also be dependencies or prerequisites. An application may depend on the existence of configured networking. Networking might be installed by a previous layer.

The present embodiments overcome noise problems in re-engineered installation packages, wherein noise is generated as a result of an OS continually making changes to files and registries all the time. For instance, between the time that the first snap shot is taken and the time the second snap shot is taken, the OS has made some changes that are not desired to be captured for incorporation into the re-engineered install (i.e., undesired changes). Such undesired changes may originate with the rebooting of the computer. These undesired changes are effectively reduced by the method of the present disclosure.

In addition, during installation of an original third party vendor product, the OS may query the target computer system and automatically make some changes based upon the type of hardware detected on the target computer system undergoing the installation. The state change model cannot understand decisions made by the installation of the vendor product. The state change model can only capture what was done on the target computer system. Capturing state change on only one computer system results in incurring a penalty of capturing noise created by the OS during a reboot and any hardware specific details that the installation package tried to capture, adapted to the given computer system. The present embodiments overcome such an undesired penalty.

The present embodiments address the desire to eliminate noise in a re-engineered installation program by a prescribed amount. The present embodiments provide a method for filtering undesired noise out of the re-engineered installation program for a vendor product, particularly for use in the BTO manufacturing process. The present embodiments further provide an approach for removing undesired noise in an automated manner.

As discussed, some noise is consistent noise, that is, every time the computer system undergoes a reboot, the noise looks identical and can thus be difficult to identify. Another category of noise is random noise, which randomly occurs. Time stamp and hardware specific information will not be identical between reboots and/or different target computer systems. Hardware specific details include those details that a vendor installation package may capture for adapting to the particular system being installed upon.

The embodiments of the present disclosure force as many of the changes as possible to be distinct and independent so that the noise is more easily identifiable. The present embodiments provide a way to identify noise which is common or substantially consistent across multiple configurations. Accordingly, installations of a given vendor product can be made more substantially consistent among installations on differently configured target computer systems in the BTO manufacturing process.

The present embodiments are typically performed in conjunction with a factory install development system or lab. Each lab is responsible for a given hardware configuration, network adapters, word processors, etc. The function of each lab is to replicate what an independent software vendor (ISV) install does on a given target system or workstation. The tool of the present disclosure is used for generating a re-engineered install, i.e., capture/create of delta one, capture/create delta 2, find the intersection of delta one and delta two, and test resultant intersection of deltas. When the intersection of deltas tests satisfactorily, then resultant delta is put onto the network server for subsequent installation of the ISV product onto target computer system in the BTO manufacturing process.

Installation of software on a target system in a manufacturing environment or other environment includes creating a re-engineered install for achieving a substantially uniform installation of a given ISV product and/or prescribed settings on a number of target systems, for example, in an office environment. That is, re-creation of the ISV product install and/or installation of prescribed settings can be achieved across a number of target systems, including other systems not necessarily in the BTO manufacturing process.

The resultant delta content may be used to make a prescribed change or changes to a number of target computer systems within a given environment, such as an office or corporate environment. For instance, the resultant delta content may be used to change a default browser on the target computer systems of the given office environment, without having to use the ISV install routine on each of the target systems. That is, the present embodiment is applicable for use in creating an executable routine for implementing desired configuration changes among a number of computer systems. The updates or configuration changes can be implemented efficiently across a number of computer systems and are more consistently produced.

With the method of the present disclosure, software patches (i.e., software updates) and configuration changes can be more consistently reproduced. If a given change is to be applied to a plurality of machines, then the present illustrative embodiments can produce executable routines for implementing the desired change or changes. The plurality of machines could include stand-alone units or units coupled to a network (WWW, Internet, Intranet, virtual private network, or other type of network). The stand-alone unit may have requested a software update from a value-added reseller (VAR), the update having been created with and/or according to the illustrative embodiments of the present disclosure.

Accordingly, a computer and method for automatically reducing data noise in an installation package for target computer systems has been disclosed. The computer includes a device for establishing a first change list based upon a set of differences resulting from installation of a vendor product on a first target computer system. The device establishes a second change list based upon a set of differences resulting from installation of the vendor product on a second target computer system. The device compares the first change list with the second change list to produce a resultant change list. The resultant change list (i.e., final transformation) includes an intersecting set of changes. The intersecting set includes common changes between installations on the first computer system and the second computer system, further for the filtering out of randomly generated installation noise.

Establishing the first change list includes capturing a first snap shot of the first target computer system configuration, wherein the first target computer system configuration has at least an operating system. A vendor install program is run for installing the vendor product onto the first target computer system. A second snap shot of the first target computer system configuration is captured, wherein the first target computer system configuration has the at least an operating system and the vendor product. A first set of differences is determined between the first and second snap shots of the first target computer system configuration for producing the first change list based upon the first set of differences.

Establishing the second change list includes capturing a first snap shot of the second target computer system configuration, wherein the second target computer system configuration has at least an operating system and one other configuration non-relevant attribute different from the first target computer system. The attribute might be indirectly relevant. For example, each system might have a different networking card to provide connectivity for the application being worked with. In this manner, application specific changes are captured while filtering card specific changes. The vendor install program is then run for installing the vendor product onto the second target computer system. A second snap shot of the second target computer system configuration is captured, wherein the second target computer system configuration has the at least an operating system, one other configuration attribute different from the first target computer system, and the vendor product. A second set of differences is determined between the first and second snap shots of the second target computer system configuration for producing the second change list based upon the second set of differences.

In the embodiments, running the vendor install program for installing a vendor product can include at least one of running a third party software installation program, rebooting the respective computer system, rendering a prescribed configuration change to each of the two computer system configurations, downloading a value added reseller configuration change to each of the two computer system configurations.

Apparatus is provided for storing a computer program accessible by an installation development computer system and processable by the installation development computer system for causing the installation development computer system to perform the capturing, running, determining, and comparing.

A re-engineered installation package is created with the intersecting set of changes, suitable for downloading a re-engineered installation of the vendor product onto at least one target computer system. Apparatus is provided for storing a computer program accessible by an installation development computer system and processable by the installation development computer system for causing the installation development computer system to perform the creating.

Furthermore, apparatus is provided for storing a computer program accessible by a computer system and processable by the computer system for causing the computer system to perform downloading of the re-engineered installation of the vendor product onto at least one target computer system. The downloading of the re-engineered installation can be through a global network or other suitable network. For instance, the global network may include a telephone network for communicating digital signals, further through a modem connection. The global network may include a global computer network, wherein the global computer network may include the Internet or the World Wide Web. Downloading may also be accomplished with the use of shippable media, such as CD-ROMs, floppy disks, etc.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. A method comprising:
    establishing a first change list based upon a set of differences resulting from installation of a configuration change on a first computer system;
    establishing a second change list based upon a set of differences resulting from installation of the configuration change on a second computer system; and
    comparing the first change list with the second change list to produce a resultant change list including an intersecting set of changes, wherein the intersecting set includes common changes between installations on the first computer system and the second computer system for the filtering out of randomly generated installation noise.

2. The method of claim 1, wherein
establishing the first change list includes:
    capturing a first snap shot of a first computer system configuration, the first computer system configuration having at least an operating system;
    running a vendor install program for installing a vendor product onto the first computer system;
    capturing a second snap shot of the first computer system configuration, the first computer system configuration having the at least one operating system and the vendor product; and
    determining a first set of differences between the first and second snap shots of the first computer system configuration and producing the first change list based upon the first set of differences; and
establishing the second change list includes:
    capturing a first snap shot of a second computer system configuration, the second computer system configuration having at least an operating system;
    running a vendor install program for installing a vendor product onto the second computer system;
    capturing a second snap shot of the second computer system configuration, the second computer system configuration having the at least one operating system and the vendor product; and
    determining a second set of differences between the first and second snap shots of the second computer system configuration and producing the second change list based upon the second set of differences.

3. The method of claim 2, wherein
running the vendor install program for installing a vendor product includes running a third party software installation program.

4. The method of claim 3, wherein
running the vendor install program for installing a vendor product includes rebooting the respective computer system.

5. The method of claim 2, wherein
running the vendor install program for installing a vendor product includes rendering a prescribed configuration change to each of the two computer system configurations.

6. The method of claim 5, wherein
running the vendor install program for installing a vendor product includes rebooting the respective computer system.

7. The method of claim 2, wherein
running the vendor install program for installing a vendor product includes downloading a value added reseller configuration change to each of the two computer system configurations.

8. The method of claim 7, wherein
running the vendor install program for installing a vendor product includes rebooting the respective computer system.

9. The method of claim 2, and comprising
providing apparatus for storing a computer program accessible by an installation development computer system and processable by the installation development computer system for causing the installation development computer system to perform the capturing, running, determining, and comparing.

10. The method of claim 1, and comprising:
creating a re-engineered installation package with the intersecting set of changes suitable for downloading a re-engineered installation of the configuration change onto at least one target computer system.

11. The method of claim 10, and comprising:
providing apparatus for storing a computer program accessible by an installation development computer system and processable by the installation development computer system for causing the installation development computer system to perform the creating.

12. The method of claim 10, and comprising:
providing apparatus for storing a computer program accessible by a computer system and processable by the computer system for causing the computer system to perform downloading of the re-engineered installation of the configuration change onto at least one target computer system.

13. The method of claim 12, wherein the downloading of the re-engineered installation is through a global network.

14. The method of claim 13, wherein the downloading of the re-engineered installation comprises:
having the global network include a telephone network for communicating digital signals.

15. The method of claim 14, wherein the downloading of the re-engineered installation comprises:
having the telephone network for communicating digital signals through a modem connection.

16. The method of claim 13, wherein the downloading of the re-engineered installation comprises:
having the global network include a global computer network.

17. The method of claim 16, wherein the downloading of the re-engineered installation comprises:
having the global computer network include a network selected from the group consisting of the Internet and the World Wide Web.

18. A method comprising:
establishing a first change list based upon a set of differences resulting from installation of a configuration change on a first computer system;
establishing a second change list based upon a set of differences resulting from installation of the configuration change on a second computer system; and
comparing the first change list with the second change list to produce a resultant change list including an intersecting set of changes, wherein the intersecting set includes common changes between installations on the first computer system and the second computer system for the filtering out of randomly generated installation noise; and
establishing at least a third change list based upon a set of differences resulting from installation of a configuration change on at least a third computer system; and comparing the first, second, and at least third change lists to produce the resultant change list including an intersecting set of changes, wherein the intersecting set includes common changes between installations on the first, second, and at least third computer systems for the filtering out of randomly generated installation noise.

19. A method comprising:
capturing a first snap shot of a first computer system configuration, the first computer system configuration having at least an operating system;
running a vendor install program for installing a vendor product onto the first computer system;
capturing a second snap shot of the first computer system configuration, the first computer system configuration having the at least one operating system and the vendor product;
determining a first set of differences between the first and second snap shots of the first computer system configuration and producing a first change list based upon the first set of differences;
capturing a first snap shot of a second computer system configuration, the second computer system configuration having at least an operating system;
running a vendor install program for installing a vendor product onto the second computer system;
capturing a second snap shot of the second computer system configuration, the second computer system configuration having the at least one operating system and the vendor product;
determining a second set of differences between the first and second snap shots of the second computer system configuration and producing a second change list based upon the second set of differences;
comparing the first change list with the second change list to produce a resultant change list including an intersecting set of changes, wherein the intersecting set includes common changes between installations on the first computer system and the second computer system for the filtering out of randomly generated installation noise; and
creating a re-engineered installation package with the intersecting set of changes suitable for downloading a re-engineered installation of the vendor product onto at least one target computer system.

20. A computer, comprising:
a device for:
establishing a first change list based upon a set of differences resulting from installation of a configuration change on a first computer system;
establishing a second change list based upon a set of differences resulting from installation of the configuration change on a second computer system; and
comparing the first change list with the second change list to produce a resultant change list including an intersecting set of changes, wherein the intersecting set includes common changes between installations on the first computer system and the second computer system for the filtering out of randomly generated installation noise.

21. The computer of claim 20, wherein
establishing the first change list includes:
capturing a first snap shot of a first computer system configuration, the first computer system configuration having at least an operating system;
running a vendor install program for installing a vendor product onto the first computer system;

capturing a second snap shot of the first computer system configuration, the first computer system configuration having the at least one operating system and the vendor product; and determining a first set of differences between the first and second snap shots of the first computer system configuration and producing the first change list based upon the first set of differences; and establishing the second change list includes:

capturing a first snap shot of a second computer system configuration, the second computer system configuration having at least an operating system;

running a vendor install program for installing a vendor product onto the second computer system;

capturing a second snap shot of the second computer system configuration, the second computer system configuration having the at least one operating system and the vendor product; and determining a second set of differences between the first and second snap shots of the second computer system configuration and producing the second change list based upon the second set of differences.

22. The computer of claim 21, wherein running the vendor install program for installing a vendor product includes running a third party software installation program.

23. The computer of claim 22, wherein running the vendor install program for installing a vendor product includes rebooting the respective computer system.

24. The computer of claim 21, wherein running the vendor install program for installing a vendor product includes rendering a prescribed configuration change to each of the two computer system configurations.

25. The computer of claim 24, wherein running the vendor install program for installing a vendor product includes rebooting the respective computer system.

26. The computer of claim 21, wherein running the vendor install program for installing a vendor product includes downloading a value added reseller configuration change to each of the two computer system configurations.

27. The computer of claim 26, wherein running the vendor install program for installing a vendor product includes rebooting the respective computer system.

28. The computer of claim 21, wherein the device is for:

providing apparatus for storing a computer program accessible by an installation development computer system and processable by the installation development computer system for causing the installation development computer system to perform the capturing, running, determining, and comparing.

29. The computer of claim 20, wherein the device is for:

creating a re-engineered installation package with the intersecting set of changes suitable for downloading a re-engineered installation of the configuration change onto at least one target computer system.

30. The computer of claim 29, and comprising:

providing apparatus for storing a computer program accessible by an installation development computer system and processable by the installation development computer system for causing the installation development computer system to perform the creating.

31. The computer of claim 29, and comprising:

providing apparatus for storing a computer program accessible by a computer system and processable by the computer system for causing the computer system to perform downloading of the re-engineered installation of the configuration change onto at least one target computer system.

32. The computer of claim 31, wherein the downloading of the re-engineered installation is through a global network.

33. The computer of claim 32, wherein the global network include a telephone network for communicating digital signals.

34. The computer of claim 33, wherein the telephone network is for communicating digital signals through a modem connection.

35. The computer of claim 32, wherein the global network includes a global computer network.

36. The computer of claim 35, wherein the global computer network includes a network selected from the group consisting of the Internet and the World Wide Web.

37. A computer, comprising:

a device for:

establishing a first change list based upon a set of differences resulting from installation of a configuration change on a first computer system;

establishing a second change list based upon a set of differences resulting from installation of the configuration change on a second computer system; and comparing the first change list with the second change list to produce a resultant change list including an intersecting set of changes, wherein the intersecting set includes common changes between installations on the first computer system and the second computer system for the filtering out of randomly generated installation noise; and establishing at least a third change list based upon a set of differences resulting from installation of a configuration change on at least a third computer system; and comparing the first, second, and at least third change lists to produce the resultant change list including an intersecting set of changes, wherein the intersecting set includes common changes between installations on the first, second, and at least third computer systems for the filtering out of randomly generated installation noise.

38. A computer, comprising:

a device for:

capturing a first snap shot of a first computer system configuration, the first computer system configuration having at least an operating system;

running a vendor install program for installing a vendor product onto the first computer system;

capturing a second snap shot of the first computer system configuration, the first computer system configuration having the at least one operating system and the vendor product;

determining a first set of differences between the first and second snap shots of the first computer system configuration and producing a first change list based upon the first set of differences;

capturing a first snap shot of a second computer system configuration, the second computer system configuration having at least an operating system;

running a vendor install program for installing a vendor product onto the second computer system;

capturing a second snap shot of the second computer system configuration, the second computer system configuration having the at least one operating system and the vendor product;

determining a second set of differences between the first and second snap shots of the second computer system configuration and producing a second change list based upon the second set of differences;

comparing the first change list with the second change list to produce a resultant change list including an intersecting set of changes, wherein the intersecting set includes common changes between installations on the first computer system and the second computer system for the filtering out of randomly generated installation noise; and creating a re-engineered installation package with the intersecting set of changes suitable for downloading a re-engineered installation of the vendor product onto at least one target computer system.

39. A computer program product, comprising:

a computer program processable by a computer system for causing the computer system to:

establish a first change list based upon a set of differences resulting from installation of a configuration change on a first target computer system;

establish a second change list based upon a set of differences resulting from installation of the configuration change on a second target computer system; and compare the first change list with the second change list to produce a resultant change list including an intersecting set of changes, wherein the intersecting set includes common changes between installations on the first target computer system and the second target computer system for the filtering out of randomly generated installation noise; and apparatus from which the computer program is accessible by the computer system.

40. The computer program product of claim 39, wherein establishing the first change list includes:

capturing a first snap shot of a first computer system configuration, the first computer system configuration having at least an operating system;

running a vendor install program for installing a vendor product onto the first computer system;

capturing a second snap shot of the first computer system configuration, the first computer system configuration having the at least one operating system and the vendor product; and determining a first set of differences between the first and second snap shots of the first computer system configuration and producing the first change list based upon the first set of differences; and establishing the second change list includes:

capturing a first snap shot of a second computer system configuration, the second computer system configuration having at least an operating system;

running a vendor install program for installing a vendor product onto the second computer system;

capturing a second snap shot of the second computer system configuration, the second computer system configuration having the at least one operating system and the vendor product; and determining a second set of differences between the first and second snap shots of the second computer system configuration and producing the second change list based upon the second set of differences.

41. The computer program product of claim 40, wherein running the vendor install program for installing a vendor product includes running a third party software installation program.

42. The computer program product of claim 41, wherein running the vendor install program for installing a vendor product includes rebooting the respective computer system.

43. The computer program product of claim 40, wherein running the vendor install program for installing a vendor product includes rendering a prescribed configuration change to each of the two computer system configurations.

44. The computer program product of claim 43, wherein running the vendor install program for installing a vendor product includes rebooting the respective computer system.

45. The computer program product of claim 40, wherein running the vendor install program for installing a vendor product includes downloading a value added reseller configuration change to each of the two computer system configurations.

46. The computer program product of claim 45, wherein running the vendor install program for installing a vendor product includes rebooting the respective computer system.

47. The computer program product of claim 40, wherein the computer program is processable by the computer system for causing the computer system to:

create a re-engineered installation package with the intersecting set of changes suitable for downloading a re-engineered installation of the configuration change onto at least one target computer system.

48. The computer program product of claim 47, wherein the computer program is processable by the computer system for causing the computer system to:

perform downloading of the re-engineered installation of the configuration change onto at least one target computer system.

49. The computer program product of claim 48, wherein the downloading of the re-engineered installation is through a global network.

50. The computer program product of claim 49, wherein the global network includes a telephone network for communicating digital signals.

51. The computer program product of claim 50, wherein the telephone network is for communicating digital signals through a modem connection.

52. The computer program product of claim 49, wherein the global network includes a global computer network.

53. The computer program product of claim 52, wherein the global computer network includes a network selected from the group consisting of the Internet and the World Wide Web.

* * * * *